United States Patent
Kishiyama et al.

(10) Patent No.: US 9,941,912 B2
(45) Date of Patent: *Apr. 10, 2018

(54) RECEIVER, TRANSMITTER AND RADIO COMMUNICATION METHOD

(71) Applicant: NTT DOCOMO, INC., Tokyo (JP)

(72) Inventors: Yoshihisa Kishiyama, Tokyo (JP); Benjebbour Anass, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,182

(22) Filed: Jul. 29, 2016

(65) Prior Publication Data

US 2016/0336981 A1   Nov. 17, 2016

Related U.S. Application Data

(62) Division of application No. 14/118,790, filed as application No. PCT/JP2012/062645 on May 17, 2012, now Pat. No. 9,438,282.

(30) Foreign Application Priority Data

May 20, 2011  (JP) ................................ 2011-114023
Oct. 14, 2011  (JP) ................................ 2011-227137

(51) Int. Cl.
   *H03D 1/04*   (2006.01)
   *H04B 1/10*   (2006.01)
   (Continued)

(52) U.S. Cl.
   CPC ............ *H04B 1/10* (2013.01); *H04J 11/0036* (2013.01); *H04J 13/004* (2013.01); *H04L 5/0037* (2013.01); *H04W 72/1205* (2013.01)

(58) Field of Classification Search
   CPC ... H04L 27/2647; H04L 1/20; H04L 27/2601; H04L 1/0025; H04N 5/4401; H04B 1/30;
   (Continued)

(56) References Cited

U.S. PATENT DOCUMENTS

2002/0181557 A1   12/2002   Fujii
2007/0223359 A1*   9/2007   Li ......................... H04L 5/0007
                                                       370/203

(Continued)

FOREIGN PATENT DOCUMENTS

CN   1393063 A    1/2003
CN   101375531 A  2/2009

(Continued)

OTHER PUBLICATIONS

Tse, D. et al., "Fundamentals of Wireless Communication", Cambridge University Press, Total pp. 583, (2005).

(Continued)

Primary Examiner — Zewdu Kassa
(74) Attorney, Agent, or Firm — Oblon, McClelland, Maier & Neustadt, L.L.P.

(57) ABSTRACT

A mobile station includes: a physical channel segmentation unit to receive radio signals including multiple orthogonal signals which are orthogonal to each other, and multiple non-orthogonal signals which are not orthogonal to each other; and data demodulating/decoding units to extract the non-orthogonal signal addressed to the mobile station from the multiple non-orthogonal signals by demodulating and cancelling the radio signal addressed to another mobile station by use of the orthogonal signals included in the radio signals received by the physical channel segmentation unit, and demodulate the signal included in the orthogonal signals and addressed to the mobile station, and the extracted non-orthogonal signal addressed to the mobile station.

9 Claims, 8 Drawing Sheets

(51) Int. Cl.
*H04J 11/00* (2006.01)
*H04J 13/00* (2011.01)
*H04L 5/00* (2006.01)
*H04W 72/12* (2009.01)

(58) Field of Classification Search
CPC ........ H04B 1/28; H04B 1/1027; H04B 1/123; H04B 1/1036; H04B 3/23; H04B 1/403
USPC ................................. 375/346, 316, 219, 295
See application file for complete search history.

(56) References Cited

U.S. PATENT DOCUMENTS

| | | | | |
|---|---|---|---|---|
| 2007/0291634 | A1* | 12/2007 | Kwon | H04B 1/707 370/208 |
| 2010/0246711 | A1 | 9/2010 | Kishigami et al. | |
| 2014/0086372 | A1 | 3/2014 | Kishiyama et al. | |

FOREIGN PATENT DOCUMENTS

| | | |
|---|---|---|
| CN | 101411154 A | 4/2009 |
| JP | 2002-111542 | 4/2002 |
| JP | 2009-111995 A | 5/2009 |
| JP | 2009-522916 | 6/2009 |
| JP | 2009-530974 | 8/2009 |
| JP | 5869836 B2 | 1/2016 |

OTHER PUBLICATIONS

International Search Report dated Jun. 12, 2012 in PCT/JP12/062645 Filed May 17, 2012.
Chinese Office Action dated Jul. 3, 2014 in Patent Application No. 201280019697.6 with English Translation.
Office Action dated Sep. 29, 2015, in Japanese Patent Application No. 2011-227137 (with unedited computer-generated English translation.
Office Action issued Oct. 18, 2016 in Japanese Patent Application No. 2016-002332 (with unedited computer generated English translation).

* cited by examiner

RECEIVER, TRANSMITTER AND RADIO COMMUNICATION METHOD

CROSS-REFERENCE TO RELATED APPLICATIONS

The present application is a divisional application of and claims the benefit of priority under 35 U.S.C. §120 from U.S. application Ser. No. 14/118,790, filed Nov. 19, 2013, which is a national stage of International Application No. PCT/JP2012/062645, filed May 17, 2012, which is based on and claims the benefit of priority under 35 U.S.C. §119 from Japanese Patent Application No. 2011-114023, filed on May 20, 2011) and Japanese Patent Application No. 2011-227137, filed on Oct. 14, 2011, the entire contents of all of which are incorporated herein by reference.

TECHNICAL FIELD

The present invention relates to a receiver, a transmitter and a radio communication method which are adapted to non-orthogonal multiple access.

BACKGROUND ART

Mobile communication systems, for example, Long Term Evolution (LTE) standardized by the 3GPP, widely use orthogonal multiple access in which multiple orthogonal signals not interfering with each other are used between a base station and user terminals (mobile stations). On the other hand, there has been proposed non-orthogonal multiple access using non-orthogonal signals to increase the capacity of a mobile communication system (for example, see Non-patent document 1).

The non-orthogonal multiple access is based on the premise of signal separation (interference canceller) through non-linear signal processing. For example, in the case of downlink, a base station simultaneously transmits non-orthogonal signals to multiple user terminals. Each of the user terminals performs signal processing to remove, from the received non-orthogonal signals, a signal addressed to a user terminal (at a cell edge) having a larger path loss than the user terminal itself, and then demodulates the resultant signal.

PRIOR ART DOCUMENT

Non-Patent Document

Non-patent document 1: D. Tse and P. Viswanath, "Fundamentals of Wireless Communication", Cambridge University Press, 2005, <http://www.eecs.berkeley.edu/~dtse/book.html> on the Internet.

SUMMARY OF THE INVENTION

As described above, in the case of non-orthogonal multiple access, each user terminal, i.e., each mobile station needs to perform demodulation after signal processing of removing the signal addressed to a mobile station having a larger path loss than the mobile station itself. For this reason, the processing load in the mobile station is so high that problems of cost increase and processing delay of the mobile station may occur.

Therefore, an objective of the present invention is to provide a receiver, a transmitter, and a radio communication method capable of using non-orthogonal multiple access while suppressing cost increase and processing delay.

In summary, a first feature of the present invention is receiver (for example, a mobile station 200A) including: a radio signal reception unit (physical channel segmentation unit 210) configured to receive radio signals including multiple orthogonal signals which are orthogonal to each other and multiple non-orthogonal signals which are not orthogonal to each other; an interference cancelation unit (data demodulating/decoding units 220) configured to extract the non-orthogonal signal addressed to the receiver from the multiple non-orthogonal signals, by demodulating and cancelling the radio signal addressed to another receiver by use of the orthogonal signals included in the radio signals received by the radio signal reception unit; and a demodulation unit (the data demodulating/decoding units 220) configured to demodulate the signal included in the orthogonal signals and addressed to the receiver, and the non-orthogonal signal extracted by the interference cancelation unit and addressed to the receiver.

A second feature of the present invention is a receiver including: a radio signal reception unit configured to receive radio signals including multiple non-orthogonal signals which are not orthogonal to each other and are transmitted by using part or all of orthogonal resources being multiple radio resources orthogonal to each other; an interference cancelation unit configured to extract the orthogonal resource including the non-orthogonal signal addressed to the receiver from the radio signals received by the radio signal reception unit, and extract the non-orthogonal signal addressed to the receiver from multiple non-orthogonal signals included in the extracted orthogonal resource, by demodulating and cancelling the radio signal addressed to another receiver; and a demodulation unit configured to demodulate the non-orthogonal signal extracted by the interference cancelation unit and addressed to the receiver.

A third feature of the present invention is a transmitter (base station 100) including: a radio signal transmission unit (a hybrid orthogonal/non-orthogonal multiplexer 130 and a physical channel multiplexer 160) configured to transmit radio signals to multiple receivers located within a cell, the radio signals including multiple orthogonal signals which are orthogonal to each other, and multiple non-orthogonal signals which are not orthogonal to each other; and a scheduling unit (a base station scheduler 120) configured to schedule signals multiplexed as the non-orthogonal signals, on the basis of path losses of the signals multiplexed as the non-orthogonal signals to the respective multiple receivers, in such a way that the signals can have a large difference in the path loss thereamong.

A fourth feature of the present invention is a radio communication method including the steps of: receiving radio signals by a communication device, the radio signals including multiple orthogonal signals which are orthogonal to each other, and multiple non-orthogonal signals which are not orthogonal to each other; extracting, by the communication device, the non-orthogonal signal addressed to the communication device from the multiple non-orthogonal signals by demodulating and cancelling the radio signal addressed to another receiver by use of the orthogonal signals included in the received radio signals; and demodulating, by the communication device, the signal included in the orthogonal signals and addressed to the communication device and the non-orthogonal signal extracted in the extracting step and addressed to the communication device.

A fifth feature of the present invention is a radio communication method including the steps of: receiving radio signals by a communication device, the radio signals including multiple non-orthogonal signals which are not orthogonal to each other and are transmitted by using part or all of orthogonal resources being radio resources orthogonal to each other; extracting, by the communication device, the orthogonal resource including the non-orthogonal signal addressed to the communication device from the received radio signals, and extracting, by the communication device, the non-orthogonal signal addressed to the communication device from a plurality of non-orthogonal signals included in the extracted orthogonal resource, by demodulating and canceling the radio signal addressed to another receiver; and demodulating the extracted non-orthogonal signal addressed to the communication device by the communication device.

MODES FOR CARRYING OUT THE INVENTION

Figure 1:
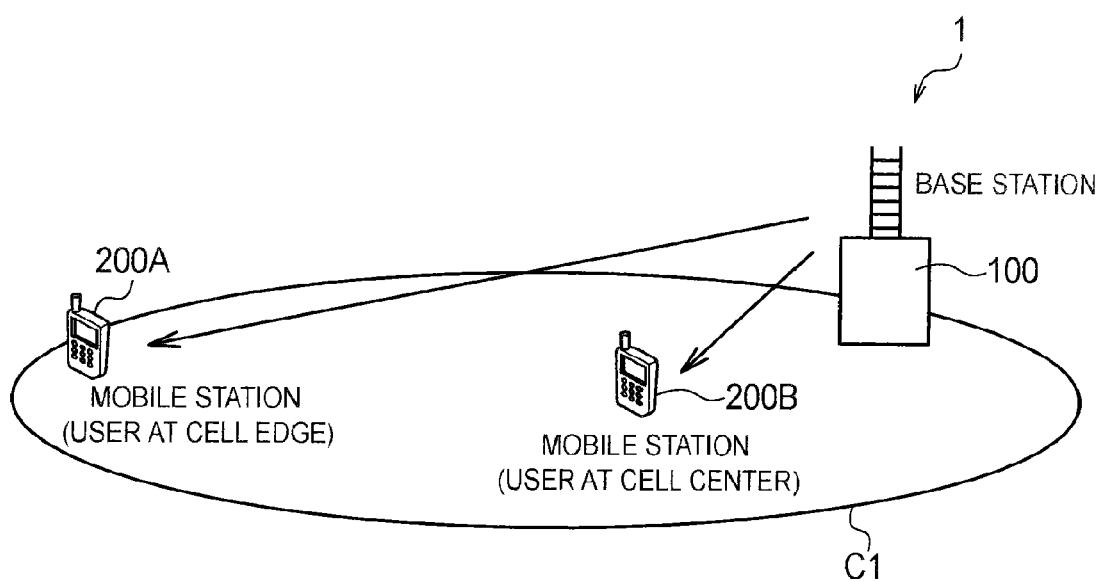
FIG. 1 is a diagram of an overall schematic configuration of a mobile communication system 1 according to an embodiment.

Hereinafter, embodiments of the present invention will be described. Note that, in the following description of the drawings, same or similar reference numerals denote same or similar elements and portions. In addition, it should be noted that the drawings are schematic and ratios of dimensions and the like in the drawings are different from actual ones.

Therefore, specific dimensions and the like should be determined in consideration of the following description. Moreover, as a matter of course, the drawings include portions having different dimensional relationships and ratios from each other.

First Embodiment

First of all, a first embodiment of the present invention is described with reference to FIGS. 1 to 6.

(1) Overall Schematic Configuration of Mobile Communication System

FIG. 1 is a diagram of an overall schematic configuration of a mobile communication system 1 according to this embodiment. As illustrated in FIG. 1, the mobile communication system 1 includes a base station 100 and mobile stations 200A, 200B.

The base station 100 transmits radio signals to the mobile stations 200A, 200B, more specifically to the inside of a cell C1. In addition, the base station 100 receives radio signals from the mobile stations 200A, 200B. In this embodiment, the base station 100 configures a transmitter and the mobile stations 200A, 200B each configure a receiver.

The mobile station 200A is located within the cell C1 but is located at a cell edge of the cell C1 where a path loss of a radio signal from the base station 100 is large. The mobile station 200B is located in the center within the cell C1. For this reason, the path loss of a radio signal from the base station 100 in the mobile station 200B is smaller than the path loss in the mobile station 200A.

In this embodiment, the base station 100 transmits radio signals to the mobile stations 200A, 200B located in the cell C1, the radio signals including multiple orthogonal signals that are orthogonal to each other, and multiple non-orthogonal signals that are not orthogonal to each other. In other words, the mobile communication system 1 uses a combination of orthogonal multiple access for implementing concurrent communications with multiple mobile stations using orthogonal signals, and non-orthogonal multiple access for implementing concurrent communications with the multiple mobile stations using non-orthogonal signals (hereinafter referred to as hybrid orthogonal/non-orthogonal multiple access).

Figure 2:
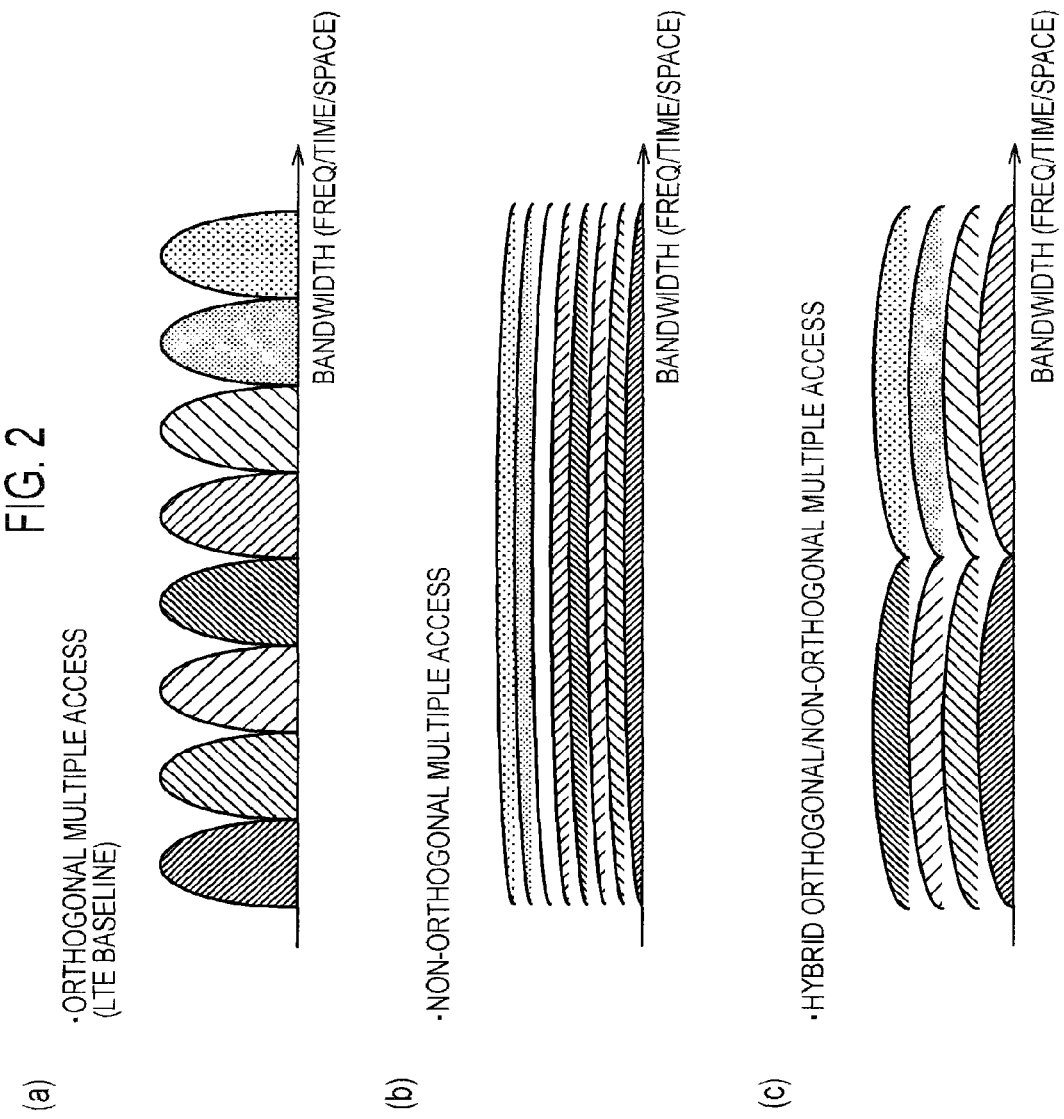
FIG. 2 is a diagram illustrating radio resource allocation images in orthogonal multiple access, non-orthogonal multiple access, and hybrid orthogonal/non-orthogonal multiple access.

Parts (a) to (c) of FIG. 2 illustrate radio resource allocation images in the orthogonal multiple access, the non-orthogonal multiple access, and the hybrid orthogonal/non-orthogonal multiple access. As illustrated in part (a) of FIG. 2, in the orthogonal multiple access, radio resources allocated to mobile stations (users) do not overlap each other in the bandwidth in a frequency domain/time domain/space domain. For this reason, in principle, the orthogonal multiple access does not need to remove interferences from the radio resources allocated to the other mobile stations. The orthogonal multiple access is also used in Long Term Evolution (LTE) standardized by the 3GPP.

As illustrated in part (b) of FIG. 2, in the non-orthogonal multiple access, radio resources allocated to mobile stations (users) overlap each other in the bandwidth mentioned above. For this reason, each mobile station needs to remove all the multiple access interferences through signal processing. The specific signal processing therefor can use the technique described in Non-patent document 1 mentioned above.

As illustrated in part (c) of FIG. 2, in the hybrid orthogonal/non-orthogonal multiple access, radio resources allocated to mobile stations (users) partly overlap each other in the bandwidth mentioned above. For this reason, each mobile station only has to remove multiple access interferences of a prescribed number or less according to the number of multiplexed radio resources.

Figure 3:
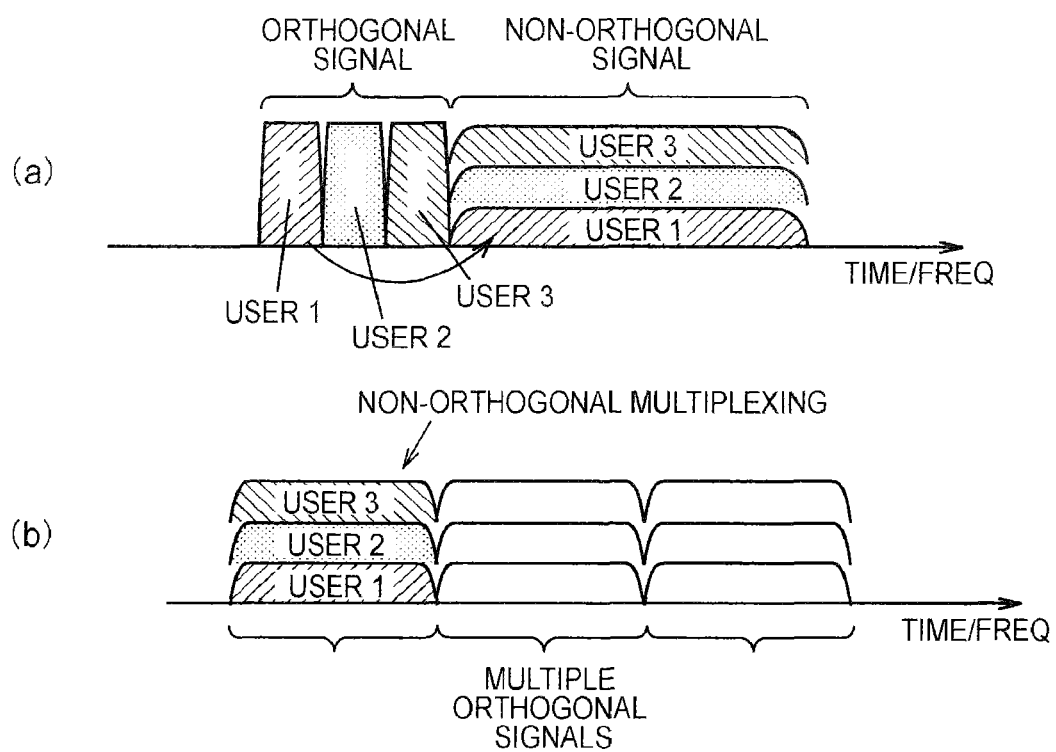
FIG. 3 is a diagram illustrating specific examples of radio resource allocation images in hybrid orthogonal/non-orthogonal multiple access.

Parts (a) and (b) of FIG. 3 illustrate more specific allocation images in the hybrid orthogonal/non-orthogonal multiple access. In an example illustrated in part (a) of FIG. 3, orthogonal signals and non-orthogonal signals are transmitted to each of users (a user 1 to a user 3). In the case of the example illustrated in part (a) of FIG. 3, each mobile station can extract the non-orthogonal signal by using the orthogonal signal.

This embodiment reduces a signal processing load associated with removal of multiple access interferences by introducing the aforementioned hybrid orthogonal/non-orthogonal multiple access, and specifies a radio interface enabling a mobile station to recognize the number of multiple access interferences to be removed. In the following description, the first embodiment is explained mainly by taking the allocation image illustrated in part (a) of FIG. 3 as an example.

(2) Functional Block Configuration

Figure 4:
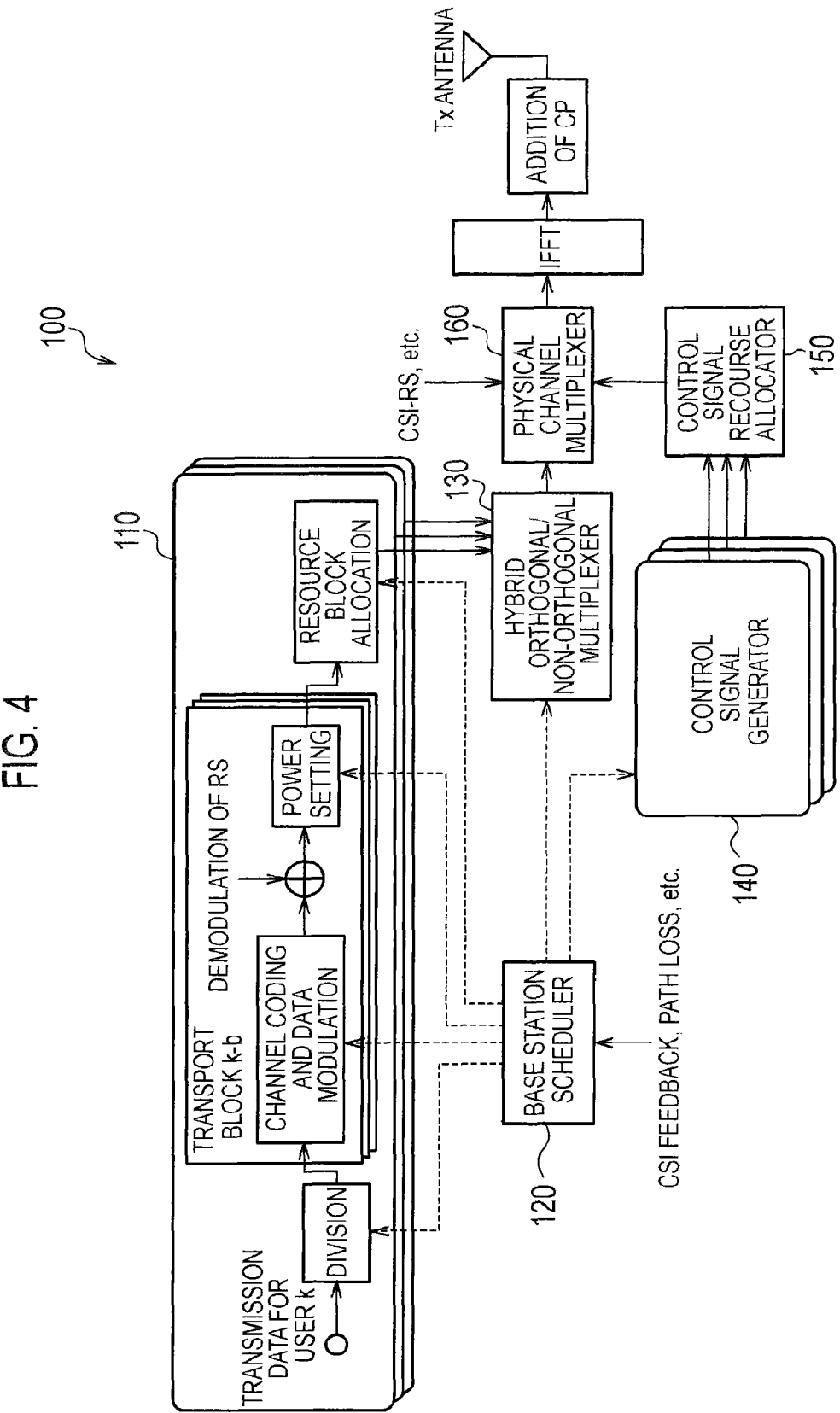
FIG. 4 is a diagram of a functional block configuration of a transmission unit of a base station 100 according to the embodiment of the present invention.
Figure 5:
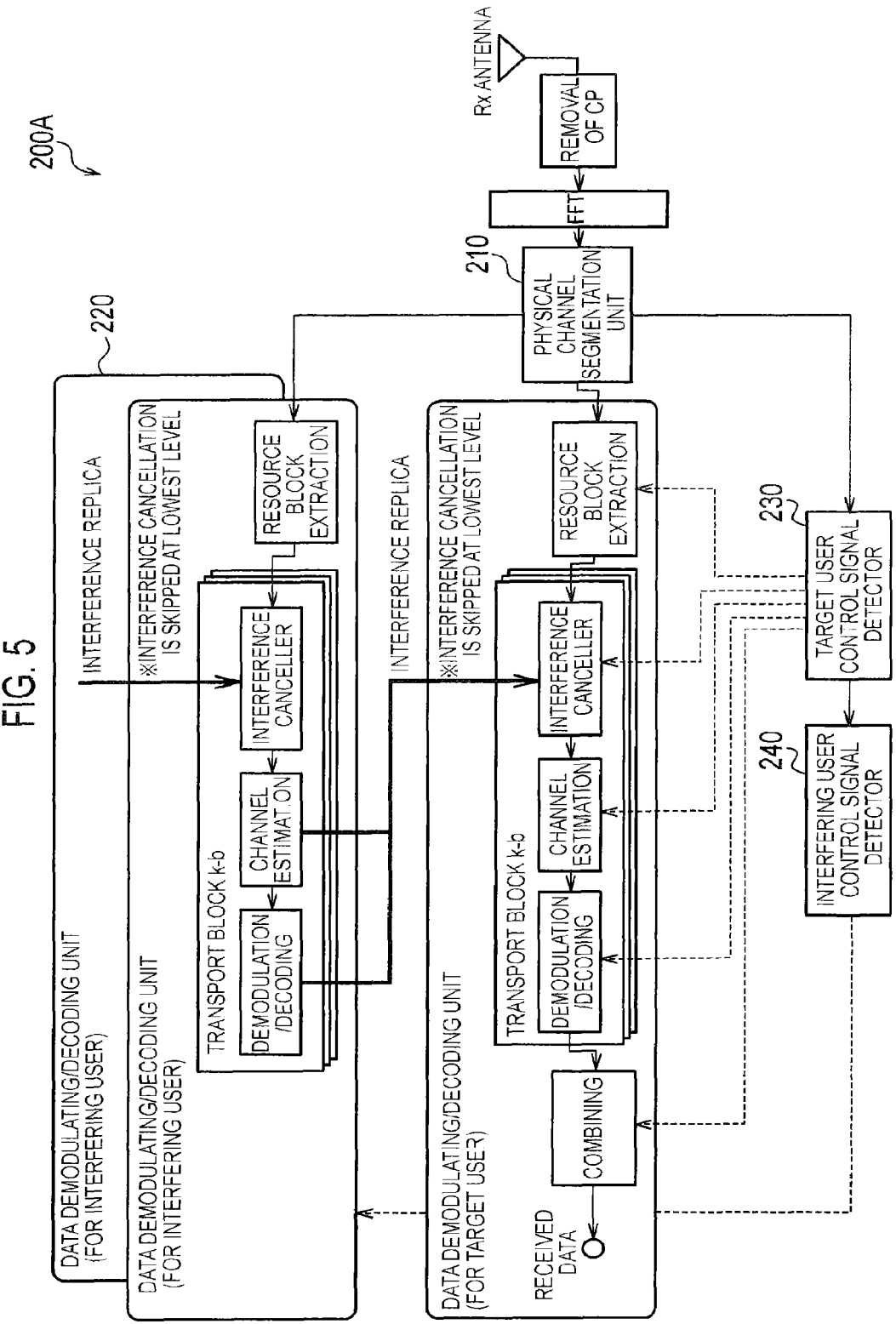
FIG. 5 is a diagram of a functional block configuration of a reception unit of a mobile station 200A according to the embodiment of the present invention.

Next, a functional block configuration of the mobile communication system 1 is described. FIG. 4 is a diagram of a functional block configuration of a transmission unit of the base station 100. FIG. 5 is a diagram of a functional block configuration of a reception unit of the mobile station 200A.

(2.1) Base Station 100

As illustrated in FIG. 4, a transmission unit of the base station 100 includes coding/data modulating units 110, a base station scheduler 120, a hybrid orthogonal/non-orthogonal multiplexer 130, a control signal generator 140, a control signal resource allocator 150 and a physical channel multiplexer 160.

The coding/data modulating units 110 perform division of transmission data, channel coding/data modulation, transmission power setting, and resource block allocation for their respective predetermined users (user k).

The base station scheduler 120 controls the coding/data modulating units 110, the hybrid orthogonal/non-orthogonal multiplexer 130 and the control signal generator 140 on the basis of information such as feedbacks of Circuit State Information (CSI) from the mobile stations 200A, 200B, and the path loss between the base station 100 and each of the mobile stations 200A, 200B.

In this embodiment in particular, the base station scheduler 120 schedules signals multiplexed as non-orthogonal signals for multiple mobile stations (for example, the mobile stations 200A, 200B), on the basis of the path losses of the signals multiplexed as non-orthogonal signals to the respective multiple mobile stations, in such a way that the signals can have a large difference in the path loss among them.

Figure 6:
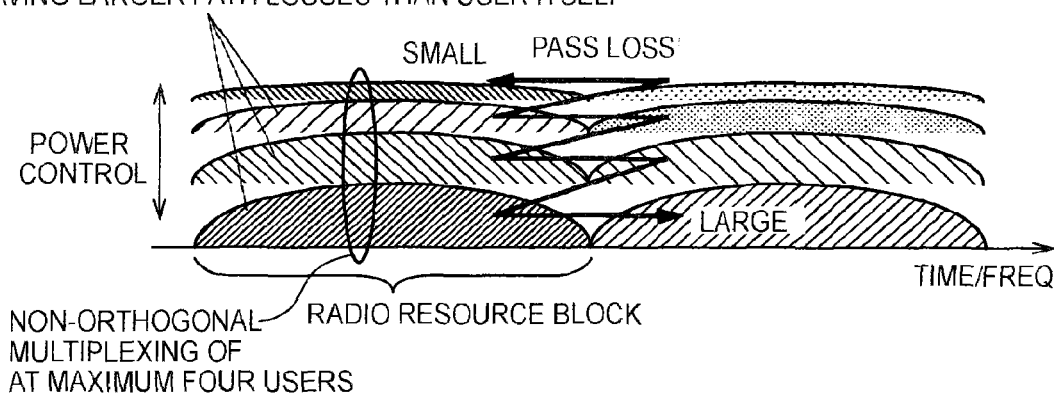
FIG. 6 is a diagram illustrating an example of scheduling of non-orthogonal signals for mobile stations in the base station 100 according to the embodiment of the present invention.

FIG. 6 illustrates an example of scheduling of non-orthogonal signals for mobile stations in the base station 100. The example illustrated in FIG. 6 uses non-orthogonal signals with which at maximum four users (mobile stations) are multiplexed. As illustrated in FIG. 6, in the case of non-orthogonal signals, multiple signals are not orthogonal to each other, in other words, the same radio resource block in the frequency domain or time domain is allocated to the multiple signals.

In this embodiment, signals are multiplexed as non-orthogonal signals sequentially from a signal addressed to a mobile station having the smallest path loss to a signal addressed to a mobile station having the largest path loss. A signal addressed to a mobile station having a small path loss only needs low transmission power to surely obtain a desired SNR, and therefore accounts for a small share in a vertical axis (transmission power) direction in FIG. 6. On the other hand, a signal addressed to a mobile station having a large path loss needs high transmission power to surely obtain a desired SNR, and therefore accounts for a large share in the vertical axis (transmission power) direction in FIG. 6.

In the case of using such non-orthogonal signals, for example, the user (mobile station) having the second smallest path loss needs to remove interferences from the signals allocated to the two mobile stations having the larger path losses than the user (see explanation in the drawing).

Note that, the example illustrated in FIG. 6 also uses orthogonal signals to which different radio resource blocks in the frequency domain and time domain are allocated, i.e., multiple signals orthogonal to each other. Since the aforementioned interference does not occur between the orthogonal signals, the mobile stations do not have to remove the interference.

The hybrid orthogonal/non-orthogonal multiplexer 130 multiplexes the orthogonal signals and the non-orthogonal signals. Specifically, the hybrid orthogonal/non-orthogonal multiplexer 130 multiplexes signals (radio resource blocks) outputted from the multiple coding/data modulating units 110 under the control of the base station scheduler 120. As a result, the multiplexed signals as illustrated in FIG. 6 are generated.

The control signal generator 140 generates various kinds of control signals to be broadcasted to the mobile stations 200A, 200B. In this embodiment, in particular, the maximum number of signals multiplexed as non-orthogonal signals (for example, quad multiplexing) is known to the base station 100 and the mobile stations 200A, 200B. The control signal generator 140 generates a control signal necessary for a mobile station to demodulate and cancel radio signals addressed to other mobile stations (other devices).

The control signal generator 140, for example, can generate a signal including the following control information or reference signal in order for the mobile station to demodulate and cancel radio signals addressed to other mobile stations (other devices):

(a) information indicating the number (including 0 or 1) of multiple access interferences to be removed by a user (mobile station);
(b) information indicating the conditions (such as allocated radio resource block, modulation scheme and channel coding rate) of other users, which are needed by the user (mobile station) to remove multiple access interferences;
(c) a reference signal necessary for coherent demodulation in the user (mobile station); and
(d) information (transport block, definition of a radio resource block, transmission power control, feedback control signal, and the like) necessary for allocation of radio resource blocks in the hybrid orthogonal/non-orthogonal multiple access.

Note that the control signal generator 140 may generate a control signal including any one or any combination of the above (a) to (d). The control signal generator 140 transmits the generated control signal to the mobile stations 200A, 200B via the control signal resource allocator 150 and the physical channel multiplexer 160. In this embodiment, the control signal generator 140 configures a control signal transmission unit.

The control signal resource allocator 150 allocates a radio resource block to the control signal outputted from the control signal generator 140.

The physical channel multiplexer 160 multiplexes baseband signals outputted from the hybrid orthogonal/non-orthogonal multiplexer 130 and the control signal outputted from the control signal resource al locator 150 with each other in physical channels. The signals outputted from the physical channel multiplexer 160 are subjected to IFFT and Cyclic Prefix (CP) is added to the resultant signals. Then, the signals are transmitted to the mobile stations 200A, 200B from a transmission antenna. In this embodiment, the hybrid orthogonal/non-orthogonal multiplexer 130 and the physical channel multiplexer 160 configure a radio signal transmission unit to transmit orthogonal signals and non-orthogonal signals to multiple mobile stations (receivers) located within the cell C1.

Note that the hybrid orthogonal/non-orthogonal multiplexer 130 and the physical channel multiplexer 160 (radio signal transmission unit) can also transmit information to each of the mobile stations (receivers) by using an orthogonal signal, the information needed by the mobile station to extract an orthogonal resource including a non-orthogonal signal addressed to the mobile station.

For example, signals transmitted as orthogonal signals (in an orthogonal resource) include a control signal, a reference signal, a data signal having a small payload size (Voice over IP (VoIP), TCP ACK, or the like), and so on. The mobile station demodulates the non-orthogonal signal by using the orthogonal signal, but demodulates the orthogonal signal directly. Here, the border between the orthogonal signal (orthogonal resource) and the non-orthogonal signal (non-orthogonal resource) may be fixed, or instead may be varied and notified as system information to each of the users.

(2.2) Mobile Station 200A

As illustrated in FIG. 5, the mobile station 200A includes a physical channel segmentation unit 210, data demodulating/decoding units 220, a target user control signal detector 230 and an interfering user control signal detector 240. Note that the mobile station 200B has the same functional block configuration as the mobile station 200A.

The physical channel segmentation unit 210 receives radio signals transmitted from the base station 100, and performs segmentation of physical channels included in the radio signals. As described above, the radio signals received by the physical channel segmentation unit 210 include the orthogonal signals and the non-orthogonal signals. The segmented physical channels are outputted to the data demodulating/decoding units 220, the target user control signal detector 230 and the interfering user control signal detector 240. In this embodiment, the physical channel segmentation unit 210 configures a radio signal reception unit.

There are provided multiple data demodulating/decoding units 220. Specifically, the data demodulating/decoding units 220 are provided for interfering users and a target user according to the number of signals (users) multiplexed as non-orthogonal signals. In this embodiment, since at maximum four users are multiplexed, it is preferable to also provide four data demodulating/decoding units 220.

The data demodulating/decoding units 220 each execute radio resource block extraction, interference canceller, channel estimation, demodulation/decoding and decoded data combining.

In particular, in this embodiment, the interference canceller of the data demodulating/decoding units 220 extracts the non-orthogonal signal addressed to the mobile station 200A from the multiple non-orthogonal signals by demodulating and cancelling the radio signals addressed to the other mobile stations (receivers) by use of the orthogonal signals (for example, the foregoing control information and reference signal) included in the received radio signals.

Specifically, the interference canceller extracts the signal addressed to the owner device from the received non-orthogonal signals by signal separation through predetermined signal processing, and cancels the interferences from the signals addressed to the other receivers. Since the maximum number of multiplexed non-orthogonal signals is known (quad multiplexing in this embodiment), the interference canceller demodulates and cancels the radio signals addressed to the other receivers within the range not exceeding the known maximum number of non-orthogonal signals. Note that the interference cancelling method will be described later.

The target user control signal detector 230 detects the control signal addressed to the target user, i.e., the owner device (mobile station 200A). The target user control signal detector 230 provides the detected control signal to the data demodulating/decoding unit 220 (for the target user). Any one or combination of the above (a) to (d) is used as the control signal.

The interfering user control signal detector 240 detects the control signals addressed to the interfering users, i.e., the other devices (for example, the mobile station 200B). As similar to the target user control signal detector 230, the interfering user control signal detector 240 provides the detected control signals to the data demodulating/decoding units 220 (for the interfering users).

Here, the signal processing in the interference canceller in the data demodulating/decoding units 220 is explained briefly. First, when the mobile station 200A is located at the cell edge of the cell C1 as illustrated in FIG. 1, the interference canceller cannot remove the signal of the mobile station 200B located in the center within the cell C1. For this reason, the data demodulating/decoding unit 220 performs the demodulation/decoding directly. Specifically, the signal processing in the user 1 can be explained based on the following computational expression:

[Expression 1]

$$h_1(x_1 + x_2) + w_1 \xrightarrow{\text{With interference from User 2}} \boxed{\text{Decode for User 1}} \rightarrow x_1 \quad R_1 = \log_2\left(1 + \frac{P_1|h_1|^2}{P_2|h_1|^2 + N_0}\right)$$

Here, the user 1 denotes the mobile station 200A located at the cell edge of the cell C1, and the user 2 denotes the mobile station 200B located in the center in the cell C1. $P_1$ and $P_2$ are transmission powers of the user 1 and the user 2, and $h_1$ and $h_2$ are channel gains of the user 1 and the user 2.

As described above, in the case where the mobile station (user 1) is located at the cell edge, the received signals ($R_1$) include an interference from the mobile station (user 2) located in the cell center, but the user 1 cannot remove the interference from the user 2 because having a poorer SNR than the user 2. Hence, the user 1 executes the demodulation/decoding directly without removing the signal of the user 2.

On the other hand, the signal processing in the user 2 can be explained based on the following computational expression:

[Expression 2]

$$h_2(x_1 + x_2) + w_2 \rightarrow \boxed{\text{Decode for User 1}} \rightarrow x_1$$
$$h_2 x_1 \leftarrow \cdots$$
$$h_2 x_2 + w_2 \rightarrow \boxed{\text{Decode for User 2}} \rightarrow x_2 \quad R_2 = \log_2\left(1 + \frac{P_2|h_2|^2}{N_0}\right)$$

No interference

As described above, in the case where the mobile station (user 2) is located at the cell center, the received signals ($R_2$) include an interference from the mobile station (user 1) located at the cell edge. Since the user 2 has a better SNR than the user 1, the user 2 removes the signal of the user 1 by decoding it once, and then demodulates/decodes the signal of the user 2 after removing the signal of the user 1.

Note that this signal processing is the same as the method described in above Non-patent document 1.

(3) Example of Operation and Effects

In the mobile communication system 1 according to this embodiment, the mobile station 200A (200B) cancels interferences from the signals addressed to the other receivers due to use of the non-orthogonal signals, and demodulates both the signal having the interferences cancelled therein and addressed to the mobile station 200A, and the signal included in the orthogonal signals and addressed to the mobile station 200A. In short, the hybrid orthogonal/non-orthogonal multiple access using orthogonal signals and non-orthogonal signals is realized. In the case of the hybrid orthogonal/non-orthogonal multiple access, the processing load for cancelling interferences of signals addressed to the other receivers is reduced in comparison with the case of using only the non-orthogonal multiple access, and thereby cost increase and processing delay of the mobile station can be suppressed.

In this embodiment, the maximum number of signals multiplexed as the non-orthogonal signals is known to the base station 100 and the mobile stations 200A, 200B. The interference canceller of the demodulating/decoding unit 220 demodulates and cancels interferences of the number of signals addressed to other devices, the number designated by the control information or the like within the range not exceeding the known maximum number of the signals. Thus, the mobile station 200A, 200B can be designed such that the delay time required for the demodulation/decoding can be within a certain range.

In this embodiment, on the basis of the path losses of signals multiplexed as non-orthogonal signals to multiple mobile stations, the signals multiplexed as the non-orthogonal signals are scheduled for the multiple mobile stations so that the signals can have a large difference in path loss among them. Thus, SNRs of the signals multiplexed as the non-orthogonal signals tend to vary largely and it becomes easy to remove the interferences from the signals addressed to the other devices.

Second Embodiment

In the foregoing first embodiment, the description is mainly provided for the operation based on the radio resource (orthogonal resource and non-orthogonal recourse) allocation image illustrated in part (a) of FIG. 3. In a second embodiment, description is provided for an operation based on the radio resource allocation image illustrated in part (b) of FIG. 3, and mainly for different part of the operation from the foregoing first embodiment.

In the case of the radio resource allocation image illustrated in part (b) of FIG. 3, the physical channel segmentation unit 210 (radio signal reception unit) of the mobile station 200A receives radio signals including multiple non-orthogonal signals which are not orthogonal to each other and which are transmitted by using part or all of orthogonal resources being multiple radio resources orthogonal to each other.

In addition, the interference canceller of the data demodulating/decoding units 220 extracts, from the received radio signals, the orthogonal resource including the non-orthogonal signal addressed to the mobile station 200A. Moreover, the interference canceller extracts the non-orthogonal signal addressed to the mobile station 200A from the multiple non-orthogonal signals included in the extracted orthogonal resource, by demodulating and cancelling the radio signals addressed to the other mobile stations (the mobile station 200B). Further, the data demodulating/decoding unit 220 demodulates the non-orthogonal signal addressed to the mobile station 200A and extracted by the interference canceller.

As described above, in the case of the hybrid orthogonal/non-orthogonal multiple access based on the radio resource allocation image illustrated in part (b) of FIG. 3, the processing load for cancelling interferences of signals addressed to other mobile stations (receivers) is reduced in comparison with the case of using only the non-orthogonal multiple access, and thereby cost increase and processing delay of the mobile station can be suppressed.

Other Embodiments

Although the content of the present invention is disclosed through the embodiments of the present invention as described above, it should not be understood that the description and drawings constituting part of this disclosure limit the present invention. From this disclosure, various alternative embodiments would be obvious to those skilled in the art.

For example, the base station 100 may send the mobile stations 200A, 200B an allocation map indicating radio resources used as the orthogonal multiple access and radio resources used as the non-orthogonal multiple access.

Figure 7:
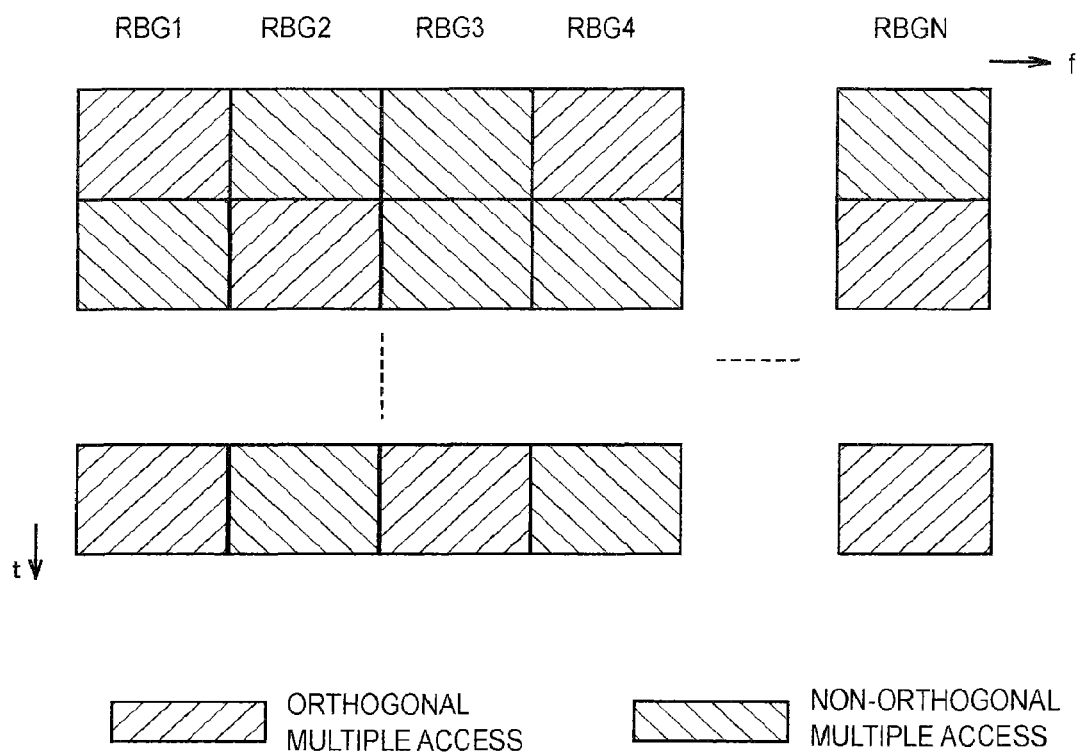
FIG. 7 is a diagram illustrating an example of an allocation map (RBG units) of orthogonal multiple access and non-orthogonal multiple access according to another embodiment of the present invention.
Figure 8:
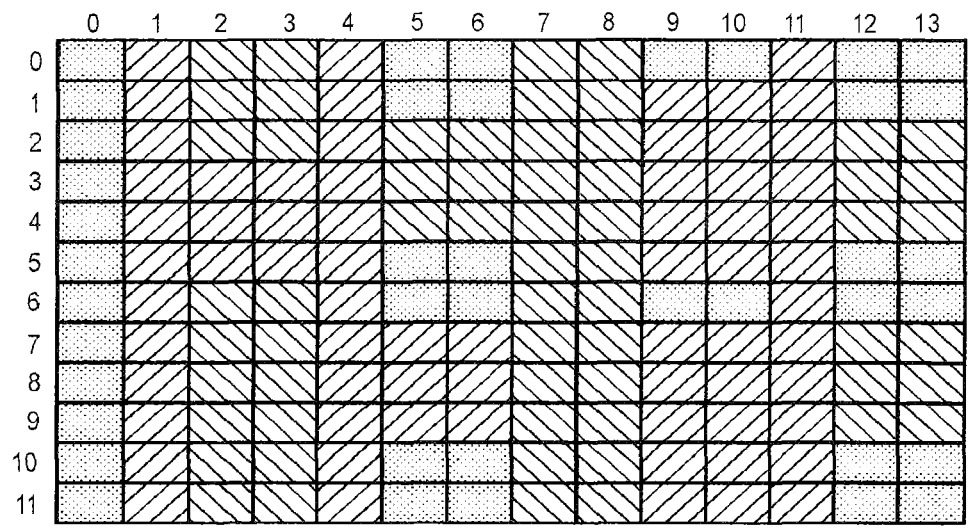
FIG. 8 is a diagram illustrating an example of a allocation map (REG units) of orthogonal multiple access and non-orthogonal multiple access according to another embodiment of the present invention.

FIG. 7 and FIG. 8 illustrate examples of allocation maps of orthogonal multiple access and non-orthogonal multiple access. FIG. 7 illustrates an example of allocation map in units of radio resource block, and FIG. 8 illustrates an allocation map example in units of radio resource elements.

Next, description is provided for a method of generating such an allocation map. The foregoing embodiment improves the whole capacity of the radio communication system and enhances the fairness among users by employing the non-orthogonal access technique using a difference in SNR among the mobile stations (users).

Here, if there is no difference in SNR among users, the orthogonal access technique is suitable. On the basis of the degree of the SNR difference, the base station 100 determines a ratio of resource blocks or resource elements between data transmission in the orthogonal multiple access and data transmission in the non-orthogonal multiple access.

The base station 100 sends the mobile stations 200A, 200B the allocation map (see FIGS. 7 and 8) of parts allocated to orthogonal multiple access (the allocated Resource blocks (RBs) or Resource elements (REs)) and parts of non-orthogonal multiple access (the allocated RBs or REs) on the basis of the degree of the SNR difference.

Specifically, the base station 100 determines the degree of the SNR difference on the basis of CSI information fed back from each of the mobile stations. The base station 100 performs processing by handling RBs, REs having a relatively large degree of SNR difference as non-orthogonal multiple access and handling RBs, REs having a relatively small degree of SNR difference as orthogonal multiple access. The base station 100 sends the mobile stations 200A, 200B the allocation map based on such processing result.

Note that DL grant, RRC signaling or the like may be used as means for notifying the content of the allocation map.

Moreover, in the foregoing embodiments of the present invention, the examples of downlink from the base station 100 to the mobile stations 200A, 200B are described. However, the hybrid orthogonal/non-orthogonal multiple access according to the present invention can be applied to uplink. Moreover, the present invention can be also applied to radio communications not only between the base station and mobile stations, but also between base stations.

As described above, the present invention naturally includes various embodiments which are not described herein. Accordingly, the technical scope of the present invention should be determined only by the matters defining the invention in the scope of claims regarded as appropriate based on the foregoing description.

INDUSTRIAL APPLICABILITY

According to the features of the present invention, provided are a receiver, a transmitter, and a radio communication method capable of using non-orthogonal multiple access while suppressing cost increase and processing delay.

EXPLANATION OF THE REFERENCE NUMERALS 1 mobile communication system
100 base station
110 coding/data modulating unit
120 base station scheduler
130 hybrid orthogonal/non-orthogonal multiplexer
140 control signal generator
150 control signal resource allocator
160 physical channel multiplexer
200A, 200B mobile station
210 physical channel segmentation unit
220 data demodulating/decoding unit
230 target user control signal detector
240 interfering user control signal detector

The invention claimed is:

1. A receiver comprising:
a radio signal reception unit configured to receive radio signals including a plurality of orthogonal signals transmitted on radio resources, which are allocated to each receiver, non-overlapping each other, and a plurality of non-orthogonal signals transmitted on radio resources, which are allocated to each receiver, overlapping each other;
a demodulation unit configured to extract the non-orthogonal signal addressed to the receiver from the plurality of non-orthogonal signals by use of the orthogonal signals included in the radio signals; and
demodulate the signal included in the orthogonal signals and addressed to the receiver, and the extracted non-orthogonal signal addressed to the receiver.

2. The receiver according to claim 1, further comprising an interference cancelation unit configured to extract the non-orthogonal signal addressed to the receiver by demodulating and canceling the radio signals addressed to other receivers, wherein
the maximum number of signals multiplexed as the non-orthogonal signals is known to the receiver, and
the interference cancelation unit demodulates and cancels the radio signals addressed to other receivers within a range not exceeding the known maximum number of non-orthogonal signals.

3. A receiver comprising:
a radio signal reception unit configured to receive radio signals including a plurality of non-orthogonal signals transmitted on radio resources, which are allocated to each receiver, overlapping each other from a plurality of orthogonal resources which are allocated to each receiver, non-overlapping each other;
a demodulation unit configured to extract the orthogonal resource including the non-orthogonal signal addressed to the receiver from the radio signals, and extract the non-orthogonal signal addressed to the receiver from a plurality of non-orthogonal signals included in the extracted orthogonal resource,
a demodulation unit configured to and demodulate the extracted non-orthogonal signal addressed to the receiver.

4. The receiver according to claim 3, further comprising an interference cancelation unit configured to extract the non-orthogonal signal addressed to the receiver by demodulating and canceling the radio signals addressed to other receivers, wherein
the maximum number of signals multiplexed as the non-orthogonal signals is known to the receiver, and
the interference cancelation unit demodulates and cancels the radio signals addressed to other receivers within a range not exceeding the known maximum number of non-orthogonal signals.

5. A transmitter comprising:
a radio signal transmission unit configured to transmit radio signals to a plurality of receivers located within a cell, the radio signals including a plurality of orthogonal signals transmitted on radio resources, which are allocated to each receiver, non-overlapping each other, and a plurality of non-orthogonal signals transmitted on radio resources, which are allocated to each receiver, overlapping each other; and
a scheduling unit configured to schedule signals multiplexed as the non-orthogonal signals for the plurality of receivers, on the basis of path losses of the signals multiplexed as the non-orthogonal signals to the plurality of respective receivers, in such a way that the signals have a large difference in the path loss therebetween.

6. The transmitter according to claim 5, wherein the radio signal transmission unit sends information to the receivers by using the orthogonal signals, the information being necessary for each of the receivers to extract an orthogonal resource including the non-orthogonal signal addressed to the receiver.

7. The transmitter according to claim 5, wherein
the maximum number of signals multiplexed as the non-orthogonal signals is known to the transmitter and the receivers, and
the transmitter comprises a control signal transmission unit configured to send each of the receivers a control signal necessary for the receiver to demodulate and cancel the signal addressed to other receivers.

8. A radio communication method comprising the steps of:
receiving radio signals by a communication device, the radio signals including a plurality of orthogonal signals transmitted on radio resources, which are allocated to each communication device, non-overlapping each other, and a plurality of non-orthogonal signals transmitted on radio resources, which are allocated to each communication device, overlapping each other;

extracting, by the communication device, the non-orthogonal signal addressed to the communication device from the plurality of non-orthogonal signals by use of the orthogonal signals included in the received radio signals; and demodulating, by the communication device, the signal included in the orthogonal signals and addressed to the communication device and the non-orthogonal signal extracted in the extracting step and addressed to the communication device.

9. A radio communication method comprising the steps of:

receiving radio signals by a communication device, the radio signals including a plurality of non-orthogonal signals transmitted on radio resources, which are allocated to each communication device, non-overlapping each other and are transmitted by using part or all of orthogonal resources being a plurality of radio resources, which are allocated to each communication device, overlapping each other;

extracting, by the communication device, the orthogonal resource including the non-orthogonal signal addressed to the communication device from the received radio signals, and extracting, by the communication device, the non-orthogonal signal addressed to the communication device from a plurality of non-orthogonal signals included in the extracted orthogonal resource; and demodulating the extracted non-orthogonal signal addressed to the communication device by the communication device.

* * * * *